United States Patent
Peacock et al.

(10) Patent No.: US 9,321,699 B2
(45) Date of Patent: Apr. 26, 2016

(54) GRANULAR FERTILIZERS HAVING IMPROVED DUST CONTROL

(71) Applicant: MOS Holdings Inc., Plymouth, MN (US)

(72) Inventors: Lawrence Alan Peacock, Riverview, FL (US); Timothy Gene Holt, Florence, AL (US); Keith Dewayne Cochran, Killen, AL (US)

(73) Assignee: The Mosaic Company, Plymouth, MN (US)

( * ) Notice: Subject to any disclaimer, the term of this patent is extended or adjusted under 35 U.S.C. 154(b) by 0 days.

(21) Appl. No.: 13/826,452

(22) Filed: Mar. 14, 2013

(65) Prior Publication Data

US 2014/0137616 A1 May 22, 2014

Related U.S. Application Data

(60) Provisional application No. 61/729,142, filed on Nov. 21, 2012.

(51) Int. Cl.
*C05G 3/00* (2006.01)

(52) U.S. Cl.
CPC ........... *C05G 3/0088* (2013.01); *C05G 3/0029* (2013.01); *C05G 3/0035* (2013.01)

(58) Field of Classification Search
CPC ................................ C05G 3/0029; B01J 2/30
USPC ........................................................ 71/64.07
See application file for complete search history.

(56) References Cited

U.S. PATENT DOCUMENTS

| | | | | |
|---|---|---|---|---|
| 3,259,482 | A * | 7/1966 | Hansen | 71/64.11 |
| 3,295,950 | A * | 1/1967 | Blouin et al. | 71/64.07 |
| 3,342,577 | A * | 9/1967 | Blouin et al. | 504/101 |
| 3,365,288 | A | 1/1968 | Detmer et al. | |
| 3,903,333 | A * | 9/1975 | Shirley et al. | 427/212 |
| 3,926,841 | A * | 12/1975 | Habasko et al. | 252/383 |
| 4,019,890 | A * | 4/1977 | Fujita et al. | 71/64.11 |
| 4,042,366 | A * | 8/1977 | Fersch et al. | 71/29 |
| 4,316,811 | A | 2/1982 | Burns et al. | |
| 4,427,719 | A | 1/1984 | Moore | |
| 4,650,598 | A | 3/1987 | Roberts et al. | |

(Continued)

FOREIGN PATENT DOCUMENTS

EP 0 313 015 A2 4/1989
EP 0302987 * 6/1989

(Continued)

OTHER PUBLICATIONS

Webster's New Collegiate Dictionary, copyright 1979 by G. & C. Merriam Co., p. 589.*

(Continued)

*Primary Examiner* — Wayne Langel
(74) *Attorney, Agent, or Firm* — Patterson Thuente Pedersen, P.A.

(57) ABSTRACT

An oil-based coating for fertilizer granules impregnated with a polymer additive and related methods of applying the oil-based coating. The polymer additive can comprise homopolymers, copolymers, or combinations thereof, including polyethylene homopolymers. The polymer additive increases the viscosity of the oil-based coating, thereby increasing the duration for which the coating is capable of controlling or inhibiting the formation of dust particulates from the fertilizer granules.

17 Claims, 1 Drawing Sheet

(56) References Cited

U.S. PATENT DOCUMENTS

| | | | |
|---|---|---|---|
| 4,676,821 A * | 6/1987 | Gullett et al. | 71/28 |
| 4,804,403 A * | 2/1989 | Moore | 71/28 |
| 5,128,178 A | 7/1992 | Roe | |
| 5,133,797 A | 7/1992 | Mahara et al. | |
| H1085 H | 8/1992 | Simmons et al. | |
| 5,147,442 A * | 9/1992 | Kosuge et al. | 71/64.07 |
| 5,219,465 A | 6/1993 | Goertz et al. | |
| 5,256,444 A | 10/1993 | Roe | |
| 5,264,019 A | 11/1993 | Gossett, Jr. et al. | |
| 5,435,821 A * | 7/1995 | Duvdevani et al. | 71/28 |
| 5,476,528 A * | 12/1995 | Trimm et al. | 71/21 |
| 5,500,220 A | 3/1996 | Roe et al. | |
| 5,599,374 A * | 2/1997 | Detrick | 71/28 |
| 5,603,745 A * | 2/1997 | Pettersen et al. | 71/58 |
| 5,639,397 A | 6/1997 | Roe | |
| 5,648,116 A | 7/1997 | Roe et al. | |
| 5,704,962 A | 1/1998 | Navascues | |
| 5,968,222 A | 10/1999 | Kodali | |
| 6,231,633 B1 | 5/2001 | Hirano et al. | |
| 6,322,606 B1 * | 11/2001 | Komoriya et al. | 71/11 |
| 6,338,746 B1 * | 1/2002 | Detrick et al. | 71/28 |
| 6,355,083 B1 | 3/2002 | Ogzewalla | |
| 6,475,259 B1 * | 11/2002 | Thomas et al. | 71/64.07 |
| 6,500,223 B1 * | 12/2002 | Sakai et al. | 71/64.07 |
| 6,514,332 B2 | 2/2003 | Varnadoe et al. | |
| 6,617,412 B2 * | 9/2003 | Markusch et al. | 528/65 |
| 6,776,832 B2 | 8/2004 | Spence et al. | |
| 7,658,862 B2 | 2/2010 | Talamoni | |
| 8,076,391 B2 | 12/2011 | Roa-Espinosa | |
| 2003/0070462 A1 | 4/2003 | Ma et al. | 71/27 |
| 2003/0075075 A1 | 4/2003 | Spence et al. | |
| 2003/0089150 A1 * | 5/2003 | Markusch et al. | 71/1 |
| 2003/0157247 A1 * | 8/2003 | Chikami et al. | 427/212 |
| 2003/0172700 A1 * | 9/2003 | Thomas et al. | 71/64.07 |
| 2004/0069033 A1 * | 4/2004 | Tijsma et al. | 71/64.02 |
| 2005/0076687 A1 * | 4/2005 | Whittington | 71/64.07 |
| 2005/0276905 A1 * | 12/2005 | Xing et al. | 427/2.1 |
| 2006/0040049 A1 | 2/2006 | Spence | |
| 2006/0222735 A1 * | 10/2006 | Rosenthal et al. | 426/28 |
| 2007/0004811 A1 | 1/2007 | Bruner et al. | |
| 2007/0163317 A1 | 7/2007 | Birthisel et al. | |
| 2008/0072641 A1 | 3/2008 | Ogzewalla | |
| 2010/0011825 A1 * | 1/2010 | Ogle et al. | 71/30 |
| 2013/0039965 A1 * | 2/2013 | Fujii et al. | 424/419 |
| 2013/0303427 A1 * | 11/2013 | Fernandez Prieto et al. | 510/299 |
| 2013/0309499 A1 * | 11/2013 | Neff et al. | 428/407 |
| 2014/0060134 A1 * | 3/2014 | Neff et al. | 71/29 |

FOREIGN PATENT DOCUMENTS

| | | | |
|---|---|---|---|
| EP | 0320987 A1 | | 6/1989 |
| EP | 0 423 836 A2 | | 4/1991 |
| EP | 0976699 A1 | | 2/2000 |
| JP | 1-108188 | * | 4/1989 |
| JP | H1-108188 | | 4/1989 |
| JP | 2-275792 | * | 11/1990 |
| JP | H2-275792 | | 11/1990 |
| JP | 3-146492 | * | 6/1991 |
| WO | WO 95/26942 | | 10/1995 |
| WO | WO 99/15480 | | 4/1999 |
| WO | WO 02/090295 A1 | | 11/2002 |
| WO | WO 2004/092254 A2 | | 10/2004 |

OTHER PUBLICATIONS

John O. Frick, Petroleum Based DCA's to Control Fugitive Dust, pp. 94-97, circa 1977.

PCT Search Report and Written Opinion dated Feb. 25, 2014 for PCT Application No. PCT/US2013/070519 filed Nov. 18, 2013, 12 pages.

Examination Report dated Jul. 31, 2015 for New Zealand Application No. 708589, 3 pages.

* cited by examiner

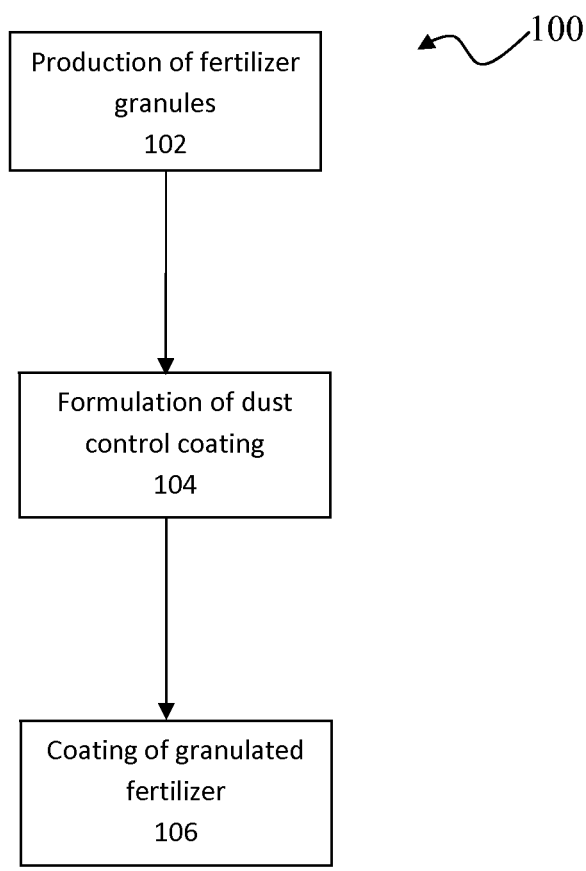

GRANULAR FERTILIZERS HAVING IMPROVED DUST CONTROL

RELATED APPLICATION

The present application claims the benefit of the U.S. Provisional Application No. 61/729,142 entitled GRANULAR FERTILIZERS HAVING IMPROVED DUST CONTROL and filed Nov. 21, 2012, which is incorporated herein in its entirety.

FIELD OF THE INVENTION

The present invention is directed to a dust control coating for reducing the dust generated in the production and transport of granulated fertilizer. Specifically, the present invention is directed to an oil-based coating with a polymer additive that improves the longevity of the oil-based coating for the purpose of dust control.

BACKGROUND OF THE INVENTION

Many agricultural fertilizers are granulated and dried after formulation to provide the fertilizer in a stable and easily handled form. An inherent drawback of the conventional granulation and drying process is that a significant portion of the fertilizer is broken down into dust. The fertilizer can also be further broken down during packaging, transport, and storage. Fertilizer with increased dusting is significantly more difficult to handle and distribute on the fields to be treated, as the dust is prone to becoming airborne such that its application is difficult to control.

In addition to wasting otherwise useful fertilizer, in some circumstances, the dust from the fertilizer creates a substantial safety risk as the chemical makeup of many fertilizers is highly reactive and can explode if ignited. The dust particulates can be easily ignited by a small spark and even by discharge of static electricity. Accordingly, the fertilizer granules are often coated with an anti-dust coating that reduces or entraps the dust created during the granulation or transport.

The anti-dust coating often comprises petroleum or other oil-based liquids that are sprayed onto the fertilizer granules to adhere any dust particulates formed, during granulation or transport, for example, to the larger fertilizer granules. The oil-based coating also encapsulates the dust particulates to prevent or inhibit the dust particulates from becoming airborne.

While oil-based coatings are effective at controlling the dust particulates, the inherent drawback of the oil-based coatings is that the coatings have a limited effective shelf-life and can have diminishing effectiveness as the coating ages. In particular, the coating itself can become dried with age and contribute to, rather than control, the dust problems. Accordingly, this can results in a significantly shortened shelf life of the fertilizer. Alternatively, prolonged storage or transport of the coated fertilizer can present a greater safety risk as the storage or transport time may have exceeded the effective life of the coating resulting in unsafe fertilizer products. As such, there is a need for prolonging the effectiveness of oil-based dust control particulates.

SUMMARY OF THE INVENTION

Embodiments of the present invention are generally directed to an oil-based coating for fertilizer granules impregnated with a polymer additive and related method of applying the oil-based coating. The polymer additive can comprise homopolymers, copolymers, or combinations thereof. In certain embodiments, polyethylene homopolymers such as high density polyethylene (HDPE), low density polyethylene (LDPE), or medium density polyethylene (MDPE), or short-branching polymers such as linear low density polyethylene (LLDPE) are incorporated for increasing the viscosity of the oil-based coating, thereby increasing the duration for which the coating is capable of controlling or inhibiting the formation of dust particulates from the fertilizer granules.

The polymer additive is added in low concentrations to improve the overall viscosity of the oil-based coating while retaining sufficient fluidity to allow the oil-based coating liquid to be applied to the fertilizer granules via a spray system. The polymer additive acts to strengthen the coating and increasing the effective life of the coating, with minimal effect to the flowability, sprayability, or coatability of the coating. Furthermore, the coating should be sufficiently degradable once applied to soil such that the fertilizer nutrients are readily released to the soil.

In embodiments, the coating comprises from about 50 to about 99 weight percent oil component and from about 1 to about 50 weight percent polymer additive, more particularly from about 70 to about 90 weight percent oil component and from about 10 to about 30 weight percent polymer additive, and even more particularly 80 weight percent oil component and 20 weight percent polymer additive. In embodiments, the coating comprises a ratio of about 1:1 to about 99:1 oil to polymer additives, more particularly, a ratio of 2.33:1 to 9:1, and even more particularly 4:1.

In embodiments, the coating makes up from about 0.01 to about 5 weight percent of the entire fertilizer granule, more particularly from about 0.1 to about 1 weight percent, and more particularly 0.5 weight percent. In embodiments, the coating can have a thickness of from about 0.1 to about 10 μm. This thin coating ensures adequate dust control, without inhibiting release of the fertilizer's nutrients to the soil, once applied.

In an embodiment, the method of forming a coated fertilizer granule comprises forming a quantity of fertilizer composition in a pre-neutralizer or reactor that is subsequently granulated within a rotating granulation drum to create a plurality of fertilizer granules. The method can also comprise combining an oil-based coating liquid heated to a temperature sufficient to melt or dissolve the polymer additive within the liquid, such as, for example, a temperature in a range from about 150° F. to about 250° F., with a quantity of polymer additive to form an oil-based coating solution for coating the formed fertilizer granules. The method can further comprise spraying, coating, or otherwise applying the oil-based coating solution onto the formed fertilizer granules to form a quantity of coated fertilizer granules.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures and the detailed description that follow more particularly exemplify these embodiments.

BRIEF DESCRIPTION OF THE CLAIMS

The invention can be completely understood in consideration of the following detailed description of various embodiments of the invention in connection with the accompanying drawings, in which:

FIG. 1 is a flow diagram of a method of making fertilizer granules having improved dust control.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

A fertilizer granule having a dust control coating includes a base fertilizer granule, with or without secondary nutrients and/or micronutrients, and a dust control coating comprising a combination of oil and a polymer additive. In embodiments, the coating makes up from about 0.01 to about 5.0 weight percent of the entire fertilizer granule, more particularly from about 0.1 to about 1 weight percent, and more particularly 0.5 weight percent. This thin coating ensures adequate dust control, without significantly inhibiting release of the fertilizer's nutrients to the soil, once applied.

The oil component can comprise any of a variety of coating oils, such as, for example, various oils derived from agriculture (such as vegetable oils) or byproducts of hydrocarbon crude purification (such as tall oils or distillation bottoms). In one particular example, the coating oil is DUSTROL available from ArrMaz chemical manufacturer. The polymer additive can comprise, for example, polyethylene homopolymers such as high density polyethylene (HDPE), low density polyethylene (LDPE), or medium density polyethylene (MDPE), or short-branching polymers such as linear low density polyethylene (LLDPE).

As described above, the polymer additive is added in low concentrations to improve the overall viscosity of the oil-based coating while retaining sufficient fluidity to allow the oil-based coating liquid to be applied to the fertilizer granules via a spray system. In embodiments, the coating comprises from about 50 to about 99 weight percent oil component and from about 1 to about 50 weight percent polymer additive, more particularly from about 70 to about 90 weight percent oil component and from about 10 to about 30 weight percent polymer additive, and even more particularly 80 weight percent oil component and 20 weight percent polymer additive. In embodiments, the coating comprises a ratio of about 1:1 to about 99:1 oil to polymer additives, more particularly, a ratio of 2.33:1 to 9:1, and even more particularly 4:1.

As shown in FIG. 1, a method 100 of producing a coated fertilizer granule, according to an embodiment of the present invention, generally comprises a fertilizer production stage 102, a dust control coating preparation stage 104, and a coating application stage 106.

As shown in FIG. 1, in the fertilizer production stage 102, a quantity of fertilizer granules are produced, as described in, for example, U.S. Pat. No. 7,497,891, entitled "Method for producing a fertilizer with micronutrients," incorporated herein by reference in its entirety, and U.S. Pat. No. 6,544,313, entitled "Sulfur-containing fertilizer composition and method for preparing same," incorporated herein by reference in its entirety. The base fertilizer can include, but is not limited to, phosphates, nitrates, ureas, potashes, or combinations thereof, providing one or more primary nutrients including carbon, hydrogen, oxygen, nitrogen, phosphorous, and potash. In a particular embodiment, the fertilizer is a phosphate fertilizer such as, for example, monoammonium phosphate (MAP), diammonium phosphate (DAP), single superphosphate, triple superphosphate, or combinations thereof.

Depending on the needs of the target plant, the fertilizer can also include one or more secondary nutrients, such as, for example, calcium, sulfur, and magnesium, and/or one or more micronutrients such as, for example, zinc, manganese, iron, copper, molybdenum, boron, chlorine, cobalt, and sodium.

Individual fertilizer granules are produced by granulation and/or compaction depending on the method of production. For example, granulation includes formulation of the fertilizer slurry, and then granulation in a rolling bed granulator, with or without a sparger (e.g. ammonia sparger), and with or without a spray applicator for addition of one or more secondary nutrients and/or micronutrients, as known to one of ordinary skill in the art. The granules are dried, such as in a drier drum, and are then screened for size. Granules that are too large or too small relative to a predetermined target size are separated from the others. Oversized particles are ground or crushed to the target size or to an undersized particle to be combined with other undersized particles. The undersized particles are recycled back to the granulator.

In coating preparation stage 104, the dust control coating is prepared by combining the oil component and the polymer additive by melting and metering the polymer additive into the oil component. The oil component is heated prior to or during the addition of the melted polymer additive. In certain embodiments, the oil component is heated to a temperature in a range of from about 150° F. to about 250° F. In one particular, non-limiting example, a polyethylene homopolymer produced by Allied Materials is melted and metered into DUSTROL coating oil such that the dust control coating comprises 80 weight percent DUSTROL and 20 weight percent polyethylene. One suitable polyethylene has a drop point of 223 degrees Fahrenheit, a hardness of 4.0, a density of 0.92 g/cm$^3$, and a viscosity of about 375 cps measured at 140 degrees Celsius. The coating is then mixed until homogeneous.

In coating application stage 106, the heated dust control coating is sprayed, coated, or otherwise applied onto the individual fertilizer granules, such as, for example, in a rolling bed to ensure complete or nearly complete coating of the granules. Coating application stage 106 can be done in line with fertilizer production stage 102, such as, for example, upon cooling of the fertilizer granules after granulation, or can be done in a separate process as fertilizer production stage 102.

In one particular example, the coating is applied at a rate (e.g. 0.1-1.0 gal of coating per ton of fertilizer granules) such that the coating comprises about 0.5% weight percent of the total coated fertilizer. The fertilizer granules are cooled until the coating is solidified. The coating on the exterior surface of the fertilizer granule is thin such that the size of the fertilizer granules is not substantially affected. In embodiments, the coating ranges in thickness of from about 0.1 to 10 about μm.

Examples of this idea using several different levels of polymer (PE) in dust control agent DUSTROL (DCA) are shown in Table I and Table II below for two different fertilizer substrates. The fertilizer substrates used in the examples are MAP- and/or DAP-based fertilizers with micronutrients, commercially available as MICROESSENTIALS SZ and MICROESSENTIAL S9.

The accelerated performance measurement procedure used to measure this data consists of the following steps: (1) Initially uncoated fertilizer substrate samples are split (with a riffler) to maintain comparable fractions; (2) The baseline material is coated with a traditional treatment (no polymer additive) while the remaining material is coated with different experimental treatments of different polymer additives and/or different coating compositions; (3) The coated samples are stored under controlled environmental conditions reflecting potential product transportation and storage conditions; and (4) The effectiveness of dust control is measured after several (2, 4, 6, 8) weeks. To measure effectiveness of dust control, samples are removed from the environmental chamber and exposed to a controlled energy input to simulate product handling. Dust sized particles from each sample are then extracted and the dust level is determined by mass difference

TABLE I

Dust level after various weeks
Dust Level (ppm)

| Sample Information | Week 2 | Week 4 | Week 6 | Week 8 |
|---|---|---|---|---|
| Baseline (MICROESSENTIALS SZ) | 4735 | 5011 | 5364 | 5498 |
| 0.5 gal/ton DCA-PE 95:5 | 2139 | 2913 | 3183 | 3118 |
| 0.5 gal/ton DCA-PE 90:10 | 2496 | 3147 | 3376 | 2810 |
| 0.5 gal/ton DCA-PE 80:20 | 2000 | 2340 | 2276 | 2055 |

TABLE II

Dust level after various weeks
Dust Level (ppm)

| Sample Information | Week 2 | Week 4 | Week 6 | Week 8 |
|---|---|---|---|---|
| Baseline (MicroEssential ® S9) | 1547 | 1043 | 2613 | 2864 |
| 0.5 gal/ton DCA-PE 97.5:2.5 | 1237 | 946 | 1790 | 2509 |
| 0.5 gal/ton DCA-PE 90:10 | 406 | 446 | 1446 | 1638 |

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A fertilizer granule coated for dust control for use in soil, comprising:
  a base fertilizer granule having at least one primary nutrient, and at least one secondary nutrient and/or micronutrient; and
  a dust control coating topically applied to a surface of the base fertilizer granule wherein the dust control coating comprises a thickness of from about 0.1 to no more than 10 μm of the base fertilizer granule, the dust control coating including:
    an oil component, and
    a polyethylene polymer additive substantially dissolved within the oil component, wherein the polymer additive is dissolvable within the oil component when the oil component is heated to a temperature above room temperature such that the oil component is flowable, and
  wherein the dust control coating does not inhibit a rate of release of nutrients present in the base fertilizer granule to the soil.

2. The fertilizer granule of claim 1, wherein the temperature of the oil component, when heated, comprises a temperature in a range from about 150° F. to about 250° F.

3. The fertilizer granule of claim 1, wherein the oil component is selected from a group consisting of agricultural oils, crude oil refinery byproducts, and combinations thereof.

4. The fertilizer granule of claim 1, wherein the polyethylene polymer additive comprises at least one polyethylene homopolymer.

5. The fertilizer granule of claim 4, wherein the at least one polyethylene homopolymer is selected from a group consisting of high density polyethylene, medium density polyethylene, low density polyethylene and linear low density polyethylene.

6. The fertilizer granule of claim 1, wherein the polyethylene polymer additive comprises less than about 50 weight percent of the dust control coating.

7. The fertilizer granule of claim 1, wherein the polyethylene polymer additive comprises from about 10 to about 30 weight percent of the dust control coating.

8. The fertilizer granule of claim 1, wherein the dust control coating comprises about 0.5 weight percent of the fertilizer granule.

9. The fertilizer granule of claim 1, wherein the base fertilizer comprises at least one of a group consisting of phosphates, nitrates, ureas and potashes.

10. The fertilizer granule of claim 9, wherein the at least one secondary nutrient and/or micronutrient is selected from a group consisting of calcium, sulfur, magnesium, zinc, manganese, iron, copper, molybdenum, boron, chlorine, cobalt, sodium, and combinations thereof.

11. A method of producing a fertilizer granule coated for dust control for use in soil, the method comprising:
  formulating a base fertilizer slurry including at least one primary nutrient and at least one secondary nutrient and/or micronutrient;
  granulating the base fertilizer slurry into a rolling bed of base fertilizer granules;
  heating an oil component;
  mixing a polyethylene polymer additive into the heated oil component to formulate a dust control coating; and
  topically applying the dust control coating to the base fertilizer granules at a rate of about 0.1-1.0 gal of coating per ton of fertilizer granules such that the dust control coating comprises a thickness of from about 0.1 to no more than 10 μm of each of the base fertilizer granules, wherein the dust control coating does not inhibit release of nutrients present in the base fertilizer granule to the soil.

12. The method of producing a fertilizer granule coated for dust control of claim 11, further comprising:
  melting the polyethylene polymer additive such that the melted polyethylene polymer additive is combined with the heated oil component.

13. The method of producing a fertilizer granule coated for dust control of claim 11, wherein oil component is heated to a temperature in a range from about 150° F. to 250° F.

14. The method of producing a fertilizer granule coated for dust control of claim 11, wherein the polyethylene polymer additive comprises about 10 to about 30 weight percent of the dust control coating.

15. The method of producing a fertilizer granule coated for dust control of claim 11, wherein the polyethylene polymer additive comprises at least one polyethylene homopolymer selected from a group consisting of high density polyethylene, medium density polyethylene, low density polyethylene and linear low density polyethylene.

16. The method of producing a fertilizer granule coated for dust control of claim 11, wherein the oil component is selected from a group consisting of agricultural oils, crude oil refinery byproducts, and combinations thereof.

17. The method of producing a fertilizer granule coated for dust control of claim 11, wherein the at least one secondary nutrient and/or micronutrient is selected from a group consisting of calcium, sulfur, magnesium, zinc, manganese, iron, copper, molybdenum, boron, chlorine, cobalt, sodium, and combinations thereof.

* * * * *